(12) United States Patent
Olgaard

(10) Patent No.: US 9,077,535 B2
(45) Date of Patent: Jul. 7, 2015

(54) SYSTEM AND METHOD FOR TESTING A RADIO FREQUENCY MULTIPLE-INPUT MULTIPLE-OUTPUT DATA PACKET TRANSCEIVER WHILE FORCING FEWER DATA STREAMS

(71) Applicant: LITEPOINT CORPORATION, Sunnyvale, CA (US)

(72) Inventor: Christian Volf Olgaard, Saratoga, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 98 days.

(21) Appl. No.: 13/894,817

(22) Filed: May 15, 2013

(65) Prior Publication Data
US 2014/0269870 A1 Sep. 18, 2014

Related U.S. Application Data

(60) Provisional application No. 61/799,296, filed on Mar. 15, 2013.

(51) Int. Cl.
*H04L 1/24* (2006.01)
*H04B 17/391* (2015.01)
*H04B 7/04* (2006.01)

(52) U.S. Cl.
CPC .............. *H04L 1/24* (2013.01); *H04B 7/0413* (2013.01); *H04B 17/3911* (2015.01)

(58) Field of Classification Search
CPC ........ H04L 1/24; G01R 29/01; G01R 35/005; H04W 24/06; H04W 52/367; H04W 24/08; H04B 7/0413; H04B 17/14; H04B 17/3911; H04B 17/0085; H04B 17/00; H04B 17/0017; H04B 17/008; H04B 1/38
See application file for complete search history.

(56) References Cited

U.S. PATENT DOCUMENTS

| 7,667,554 | B2 | 2/2010 | Tanabe | |
|---|---|---|---|---|
| 8,312,329 | B1 * | 11/2012 | Yellapantula et al. | 714/704 |
| 8,811,192 | B2 * | 8/2014 | Luong | 370/245 |
| 8,811,194 | B2 * | 8/2014 | Olgaard et al. | 370/249 |
| 8,913,517 | B2 | 12/2014 | Olgaard et al. | |
| 8,995,926 | B2 * | 3/2015 | Mow et al. | 455/67.14 |
| 2004/0187049 | A1 | 9/2004 | West | |
| 2007/0243825 | A1 | 10/2007 | Olgaard et al. | |
| 2007/0243826 | A1 * | 10/2007 | Liu | 455/67.11 |

(Continued)

FOREIGN PATENT DOCUMENTS

EP    1583265 A1    10/2005

OTHER PUBLICATIONS

International Search Report and Written Opinion dated Jun. 16, 2014 issued in connection with PCT/US2014/018252, 10 pgs.
International Search Report and Written Opinion dated Jun. 23, 2014 issued in connection with PCT/US2014/018326, 11 pgs.
U.S. Appl. No. 13/840,276, filed Mar. 15, 2013, "System and Method for Testing a Data Packet Signal Transceiver"; 32 Pages.

(Continued)

*Primary Examiner* — Hirdepal Singh
(74) *Attorney, Agent, or Firm* — Vedder Price, P.C.

(57) ABSTRACT

In accordance with the presently claimed invention, a system and method are provided for testing multiple-input, multiple-output wireless radiofrequency (RF) packet data signal transceivers while operating in such ways as to communicate their signals using various combinations or permutations of packet data streams without requiring termination or re-establishment of communication links following transitions from one combination or permutation of packet data streams to another.

20 Claims, 3 Drawing Sheets

(56) References Cited

U.S. PATENT DOCUMENTS

| | | |
|---|---|---|
| 2008/0172588 A1 | 7/2008 | Olgaard |
| 2009/0005103 A1 | 1/2009 | Eisenstadt et al. |
| 2009/0309556 A1 | 12/2009 | Franco et al. |
| 2010/0008237 A1 | 1/2010 | Olgaard et al. |
| 2010/0123471 A1* | 5/2010 | Olgaard et al. ............... 324/754 |
| 2010/0285753 A1 | 11/2010 | Foegelle |
| 2011/0053516 A1* | 3/2011 | Harteneck ................. 455/67.11 |
| 2012/0100813 A1 | 4/2012 | Mow et al. |
| 2013/0028100 A1 | 1/2013 | Olgaard |
| 2013/0301694 A1* | 11/2013 | Olgaard ....................... 375/224 |
| 2014/0194069 A1* | 7/2014 | Liu et al. ................... 455/67.14 |
| 2014/0254647 A1* | 9/2014 | Stott et al. ..................... 375/224 |

OTHER PUBLICATIONS

U.S. Appl. No. 13/841,019, filed Mar. 15, 2013, "System and Method for Testing a Data Packet Signal Transceiver"; 32 Pages.

International Search Report and Written Opinion in PCT/US2014/028609 issued on Aug. 22, 2014, 6 pages.

Article titled "Comparison Test Result Between Anechoic Chamber and Reverberation Chamber for the MIMO OTA Testing Using Thirty-Eight LTE Devices"; NTT Docomo, et al.; Munich, Germany; Mar. 12-13, 2013; 4 pages.

Article titled "Considerations on SNR Definitions for MIMO OTA Test", Agilent Technologies; Montreal, Quebec, Canada; May 10-14, 2010; 4 pages.

* cited by examiner

SYSTEM AND METHOD FOR TESTING A RADIO FREQUENCY MULTIPLE-INPUT MULTIPLE-OUTPUT DATA PACKET TRANSCEIVER WHILE FORCING FEWER DATA STREAMS

BACKGROUND

The present invention relates to testing radiofrequency (RF) wireless packet data signal transceivers, and in particular, to testing such devices having multiple inputs and multiple outputs.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such devices, engineers take extraordinary care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems ("testers") employ a subsystem for analyzing signals received from each device. Such subsystems typically include at least a vector signal generator (VSG) for providing the source signals to be transmitted to the device, and a vector signal analyzer (VSA) for analyzing signals produced by the device. The production of test signals by the VSG and signal analyses performed by the VSA are generally programmable so as to allow each to be used for testing a variety of devices for adherence to a variety of wireless technology standards with differing frequency ranges, bandwidths and signal modulation characteristics.

A recent development in the design and operation of wireless radiofrequency (RF) packet data signal transceivers as been the use of multiple inputs and multiple outputs implemented with multiple antennas. In other words, such devices, referred to as multiple-input, multiple-output (MIMO) devices, use multiple antennas for the wireless transmission and reception of their signals. Accordingly, when testing such devices, provisions must be made for testing them in such a way as to exercise their MIMO capabilities. For example, this includes operating the device under test (DUT) such that all of its transmitters and receivers are operating to transmit and receive, respectively, their respective packet data streams via their respective antenna connections. Such complete testing of a N×N (N inputs and N outputs) DUT includes transmitting and receiving data packets via each one of the wireless signal paths (e.g., antenna ports), as well as reducing the number of packet data streams being transmitted and received so as to simulate real world operation in which a packet data stream being conveyed by one or more of the antennas exhibits a null (large attenuation) and thereby prevents its successful reception and transmission to the corresponding device. Conventional test techniques to achieve this have included interrupting, disconnecting or otherwise disabling the transmission and/or reception of one of the wireless signals. However, such a complete reduction in the number of packet data streams being transmitted and received forces the DUT and the device or system with which it is communicating to re-establish their mutual wireless communication link. Such re-establishment of the communication link must be repeated for every transition from one number of packet data streams to another. For example, for a 3×3 DUT to be transitioned from operating with a three-stream (using two transmitters and three or more receivers) communication link (three antennas conveying three received signals and three transmit signals) to two-stream communication link (transmitting and receiving two streams while still using all three transmitters and three receivers) and then to single-stream communication link (where the three transmitters and three receivers use only the single stream) will require, following establishment of the initial communication link, two instances of re-establishing the communication link as the DUT transitions from reception and transmission of three packet data streams to two packet data streams and then to one packet data stream.

Such resetting of the RF signal communication link between the DUT and its communication partner (e.g., a test system including one or more VSGs and VSAs, often referred to as "tester", or a N×N MIMO reference device, such as a previously tested and proven transceiver of similar design) often takes a significant amount of time as compared to other tasks performed during the testing sequence. Many of such other parts of the other overall testing sequence are not susceptible to being shortened in their durations. Accordingly, it would be desirable to have a technique while testing a MIMO DUT for reducing transmitted and received packet data streams without requiring resetting or re-establishing the communication link.

SUMMARY

In accordance with the presently claimed invention, a system and method are provided for testing multiple-input, multiple-output wireless radiofrequency (RF) packet data signal transceivers while operating in such ways as to communicate their signals using various combinations or permutations of packet data streams without requiring termination or re-establishment of communication links following transitions from one combination or permutation of packet data streams to another.

In accordance with one embodiment of the presently claimed invention, a method of testing of a radio frequency (RF) multiple-input, multiple-output (MIMO) packet data signal transceiver device under test (DUT) includes establishing a MIMO communication link between a test transceiver and a DUT for communicating via a plurality of N DUT packet data signals provided by said DUT for said test transceiver and a plurality of test packet data signals provided by said test transceiver for said DUT, wherein N is an integer, and further includes maintaining said MIMO communication link while: corrupting at least a portion of one or more of said plurality of N DUT packet data signals to provide a partially corrupted plurality of N DUT packet data signals containing said plurality of N data streams; receiving, with said test transceiver, said partially corrupted plurality of N DUT packet data signals containing said plurality of N data streams and, responsive thereto, failing to timely provide, with said test transceiver, a corresponding portion of said plurality of test packet data signals; and following said failing to timely provide, with said test transceiver, said corresponding portion of said plurality of test packet data signals, receiving, with said test transceiver, said partially corrupted plurality of N DUT packet data signals containing a plurality of N−M data streams, wherein M is an integer and 0<N−M<N.

In accordance with another embodiment of the presently claimed invention, a method of testing of a radio frequency (RF) multiple-input, multiple-output (MIMO) packet data signal transceiver device under test (DUT) includes establishing a MIMO communication link between a test transceiver and a DUT for communicating via a plurality of N DUT packet data signals provided by said DUT for said test transceiver and a plurality of test packet data signals provided by said test transceiver for said DUT, wherein N is an integer, each one of said plurality of N DUT packet data signals includes one or more DUT data packets, and each one of said plurality of test packet data signals includes one or more test data packets, and further includes maintaining said MIMO communication link while: corrupting at least one of said one or more DUT data packets to provide said plurality of N DUT packet data signals with at least one corrupted DUT data packet and containing said plurality of N data streams; receiving, with said test transceiver, said plurality of N DUT packet data signals with at least one corrupted DUT data packet and containing said plurality of N data streams and, responsive thereto, failing to timely provide, with said test transceiver, one or more corresponding portions of said plurality of test packet data signals; and following said failing to timely provide, with said test transceiver, said one or more corresponding portions of said plurality of test packet data signals, receiving, with said test transceiver, said plurality of N DUT packet data signals with at least one corrupted DUT data packet and containing a plurality of N−M data streams, wherein M is an integer and 0<N−M<N.

DETAILED DESCRIPTION

Figure 1:
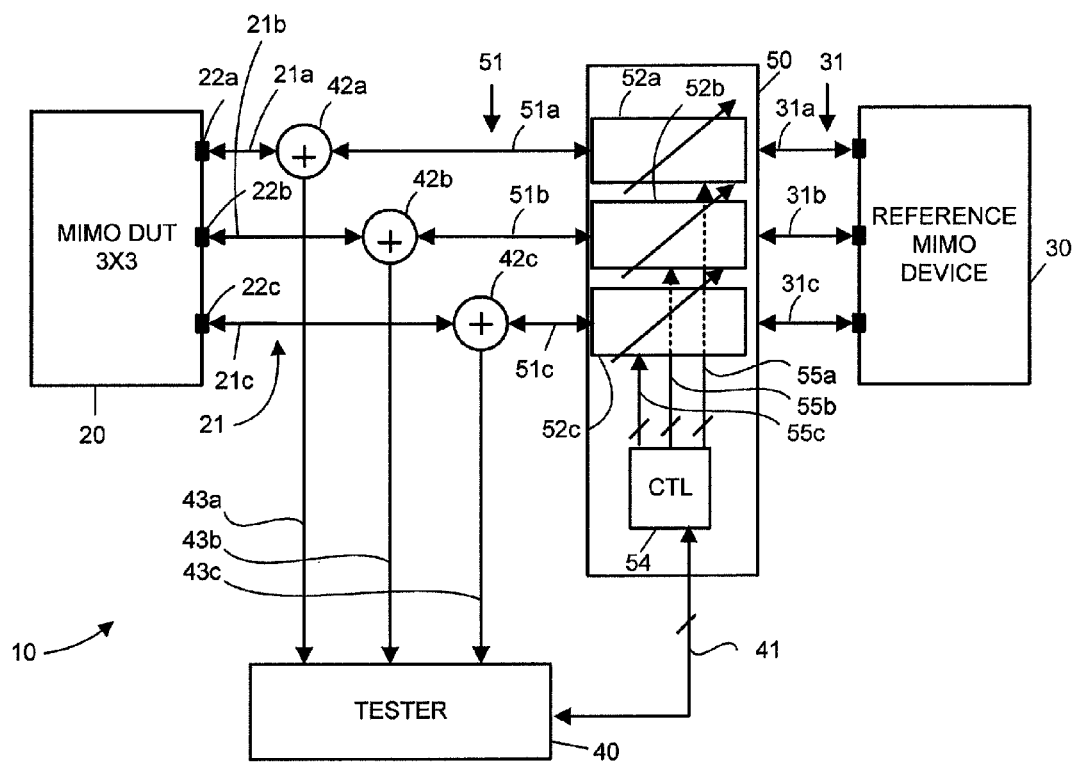
FIG. 1 depicts a test environment for testing a MIMO DUT in accordance with one or more exemplary embodiments.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Discussed in more detail below, a system and method are provided for forcing fewer transmitted and received packet data streams in a testing environment where a N×N MIMO DUT is MIMO-linked to a N×N MIMO reference device (or, alternatively, to a tester configured to operate as a N×N MIMO packet data signal transceiver). Once a N×N communication link has been established, the MIMO DUT will transmit data as packets parsed into N simultaneous parallel packet sets containing N data streams to the MIMO reference device using all N transmitters and antenna ports. In accordance with well-known principles, successful reception of all N data streams of the N parallel packet sets by the MIMO reference device will allow it to reconstruct the data. (For purposes of the following discussion, a 3×3 system and testing sequence will be discussed, i.e., where N=3. However, it will be readily understood by one skilled in the art that N can have other integer values.)

To have the MIMO DUT revert to operation using fewer packet data streams, the link would need to be interrupted, the configuration changed and a new link established such that the system only supports two packet data streams. Accordingly, if a 3×3 operation was to be changed to a two-stream operation, the data would be parsed into two data streams to be transmitted by the three DUT transmitters (or, alternatively, though less advantageous, two transmitters). This allows the MIMO reference device to reconstruct the data received from the DUT transmitters. However, since the system is actually a 3×3 system (for purposes of this example), all three transmitters should be used to transmit the two packet data streams by using spatial mapping, in accordance with well-known techniques.

As discussed in more detail below, in accordance with exemplary embodiments, the MIMO DUT is enabled to revert from an N×3 to an N×2 operation configuration without having to interrupt and then re-establish a new communication link, while still maintaining use of all DUT transmitters. In accordance with exemplary embodiments, one of the packet data streams being transmitted by one of the DUT transmitters is selectively corrupted (discussed in more detailed below) before being received by the MIMO reference device. This corruption will cause the packet data stream to be unsuccessfully received and, therefore, deemed a failure, because the MIMO reference device will be unable to reconstruct the data, since one of the packet data streams has been unsuccessfully received. As a result, the MIMO reference device will not respond by transmitting confirmation data packets.

Subsequently, the DUT again sends the packet data streams via all DUT transmitters, and again one of the packet data streams is corrupted. Accordingly, the MIMO reference device will again be unable to reconstruct the data and, therefore, not respond with confirmation data packets. At this point, the DUT, in accordance with standard protocol implemented by the applicable signal transmission standard, will revert to a reduced number of data streams, e.g., to an N×2 operation configuration, and now send the packet data streams parsed into fewer, e.g., two rather than three, packet data streams via its N DUT transmitters. The MIMO reference device can now receive both packet data streams of uncorrupted data sent by fewer of the DUT transmitters even when the third path is corrupted and respond accordingly with confirmation data packets. Hence, the DUT has effectively reverted from N×3 to N×2 operation without requiring an interruption and re-assertion, or re-establishment, of the communication link, and done so all while still using all N DUT transmitters.

As discussed in more detail below, in accordance with exemplary embodiments, a system and method are provided for testing a MIMO DUT using a compatible MIMO reference device and an intervening set of controlled signal corruption circuits, one for each DUT wireless signal path (e.g., one for each DUT antenna port). By communicating via a controller, which, in turn, controls the settings of the signal corruption circuits, a tester can cause one or more data packets being conveyed from the MIMO DUT to the MIMO reference device to be corrupted, setting up the conditions, as described above, where the DUT will revert to fewer packet data streams. (Signal corruption can be in virtually any form, so long as it causes the corrupted data packet to fail to conform to the signal communication standard or protocol while ensuring other parallel transmission packets can be received under which the DUT is being tested. Examples include signal power attenuation and partial packet attenuation.)

The tester samples the data packets being transmitted by the MIMO DUT as received by it prior to the signal corruption. Accordingly, the tester can detect and process uncorrupted data packets, while the MIMO reference device will receive both corrupted and non-corrupted data packets. Using selected data packet corruption where a latter portion of a data packet is corrupted (partial packet attenuation), rather than attenuating the signal as a whole, the process is more robust since this will minimize the possibility of an attenuated signal nonetheless being received due to leakage through the corresponding receive channel of the MIMO reference device which, due to the attenuation of the incoming signal, has increased its receive signal gain in an attempt to receive the attenuated signal.

It is important that the system monitor the duration of the packets transmitted to determine the number of streams being used by the DUT 20. For example, the DUT 20 could switch from three streams directly to one stream, which would also result in a confirmation packet being generated. However, this would result in a longer packet being generated by the DUT 20 (as the data from three streams is now contained in one stream). Different strategies to force the correct number of streams can be identified by those persons skilled in the art.

Further advantages include a reduction in test time by enabling the tester to test all possible packet data streams without interruption or re-establishment of the MIMO communication link and verification that the DUT 20 can negotiate to the environment in which only two of the three transmitted packets are possible to be successfully received. Additionally, where the wireless signal protocol being tested provides for a reduction or ratcheting down of the data rate when a data packet fails to prompt a responsive acknowledgement data packet, more (e.g., all) of the possible packet data rates prescribed by the underlying signal standard or protocol can be automatically tested.

Referring to FIG. 1, a test environment 10 in accordance with exemplary embodiments provides for testing a MIMO DUT 20 (discussed herein below as a 3×3 MIMO DUT, though other N×N or N×M configurations can be similarly tested.) Communicating with a reference MIMO device 30 while the packet data signal streams are monitored and detected by a tester 40. (It will be readily appreciated by one skilled in the art that, as an alternative, the reference MIMO device 30 can be included as part of the tester 40, or be implemented as another tester configured to operate as a compatible MIMO device.) Also included is signal corruption circuitry 50, which includes signal corruption circuits 52a, 52b, 52c, which selectively corrupt the respective packet data streams transmitted by the DUT 20 (e.g., attenuate latter portions of data packets within the respective packet data streams) in accordance with control signals 55a, 55b, 55c provided by control circuitry 54 (e.g., a field programmable gate array). The control circuitry 54, in turn, communicates with the tester 40 via a command, control and data signal interface 41.

The MIMO DUT 20 and reference MIMO device 30 communicate their respective packet data dreams and acknowledgement data packets via the signal corruption circuitry 50, signal splitters or dividers 42a, 42b, 42c, and signal paths 21, 51, 31. The signal paths 21, 51, 31, are typically conductive signal paths in the form of RF cables, where the cables 21 connecting the MIMO DUT 20 and signal splitters 42a, 42b, 42c are connected to the antenna ports 22a, 22b, 22c of the MIMO DUT 20.

In accordance with well-known principles and techniques, the signal splitters or dividers 42a, 42b, 42c (various implementations of which are well known in the art) split or divide (in terms of signal magnitude or power) the packet data signal streams transmitted by the MIMO DUT 20 during testing. These divided packet data signal streams 43a, 43b, 43c are received and monitored by the tester 40 during testing for determining whether the MIMO DUT 20 is transmitting packet data signals in accordance with the prescribed signal standard or protocol. Alternatively, if it is only desired or necessary to monitor data packet throughput using the reference MIMO device 30, the tester 40 can be omitted.

As depicted here for this example, the MIMO DUT 20 is a 3×3 DUT. Initially, the DUT 20 is configured for full MIMO (i.e., 3×3) operation. Accordingly, three packet data streams are transmitted by the DUT transmitters (not shown, but known to be within the DUT 20) for reception by the reference MIMO device 30 via their respective signal splitters 42a, 42b, 42c, signal corruption circuits 52a, 52b, 52c, and signal paths 21, 51, 31, as well as reception by the tester 40. With no corruption applied, the packet data streams are conveyed from the DUT 20 to the reference device 30 fully intact. However, if as a data packet is transmitted it later becomes sufficiently corrupted (e.g., attenuated) as it is received by the reference device 30, then one or more packet data signal streams containing such selectively corrupted data packets will be unsuccessfully received by the reference device 30. This will prevent the reference device 39 from being able to reconstruct the data from the non-corrupted data packets, and, as a result, not respond with a corresponding confirmation, or acknowledgement, data packet (or parallel confirmation packets).

It should be noted that because the packet was not attenuated initially, i.e., during the beginning of the data packet conveyance, the corresponding receiver circuit within the MIMO reference device 30 will maintain a signal gain that will remain substantially constant during the remainder of the data packet, thereby limiting the possibility of reception of the corrupted data packet due to an increased signal gain caused by the gain control circuitry of the receiver circuit that would automatically increase signal gain if the packet data signal stream were attenuated from the outset.

Figure 2:
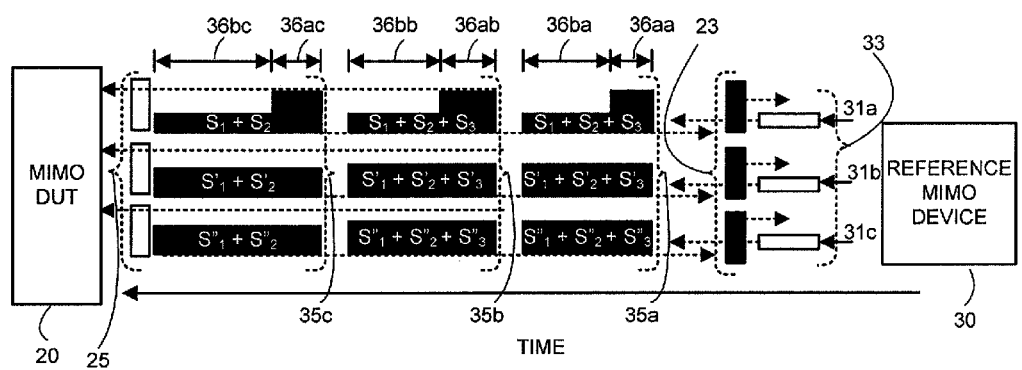
FIG. 2 depicts a signal timing diagram resulting from testing a MIMO DUT in accordance with one or more exemplary embodiments.

Referring to FIG. 2, a system and method such as described above for reducing MIMO signal streams without interrupting or otherwise altering initial MIMO communication link conditions can be better understood. The MIMO reference to device 30 transmits a set of data packets 33 (e.g., "ping" packets, though other types of packets can be used as well) from its three signal transmitter subsystems (not shown though known to be within the reference MIMO device 30). Such packets 33 are conveyed to the DUT 20 via the signal paths 21, 51, 31, signal splitters 42a, 42b, 42c, and signal corruptions circuits 52a, 52b, 52c, where the latter are set by their control circuitry 54 to not yet introduce any disabling signal corruption. In response, the DUT 20 transmits one or more confirmation data packets 23 from its respective transmitter subsystems. With a communication link now established between the DUT 20 and reference device 30, the DUT 20 follows up with response data packets 35a (having packet durations similar to those of the initial packets 33) containing three respective data streams: $S_1$, $S_2$ and $S_3$; $S_1'$, $S_2'$ and $S_3'$; and $S_1''$, $S_2''$ and $S_3''$. Ordinarily, the reference device 30 would receive the three packet data streams and be able to reconstruct the data. However, prior to these data streams being received by the reference device 30, one of the packet streams, e.g., the packet arriving at the first, or top, signal port 31a of the reference device 30, is corrupted (e.g., attenuated) as shown. As discussed above, during a first portion, or time interval, 36aa of the data packet, it remains non-corrupted. However, during a latter portion 36ba, corruption is applied by the corresponding signal corruption circuit 52a. As a result, the reference device 30 cannot reconstruct the data and, accordingly, does not respond to the DUT 20 by transmitting confirmation packets.

The DUT 20 can continue to respond by re-transmitting the same data packets 35b (since the previous packets were not successfully received) now having a reduced data rate, though still using three packet data streams. However, as before, the first packet data stream is corrupted during a latter portion 36bb following an initial portion 36ab during which no corruption is applied so as to cause the receiver circuitry to maintain its initial nominal signal gain. As a result, again, the reference device 30 cannot reconstruct the data and does not respond with confirmation packets. Accordingly, as shown, the DUT 20 continues to transmit, this time with another set of response data packets 35c. However, the DUT 20 has now reverted to a two-stream operation configuration using a decided data rate (which can be equal, higher or lower than the previous three-stream operation), with the data now parsed into two signal streams for continued transmission via all three DUT transmission paths: $S_1$ and $S_2$; $S_1'$ and $S_2'$; $S_1''$ and $S_2''$.

As a result, despite one of the data packets being corrupted (i.e., the data packet containing the first signal stream $S_1$ and $S_2$) the reference device 30 now receives two packets with the two parsed streams ($S_1'$ and $S_2'$, and $S_1''$ and $S_2''$), which are now sufficient to allow the reference device 30 to reconstruct the data. Accordingly, it responds by sending confirmation packets 25.

Figure 3:
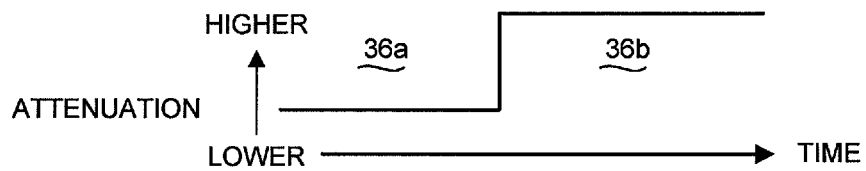
FIG. 3 is a timing diagram for signal corruption as applied in the test environment of FIG. 1 and as represented in FIG. 2.

Referring to FIG. 3, as discussed above, during an initial interval 36a of the data packet to be corrupted, the applied, or induced, corruption is disabled (or at least significantly decreased). Subsequently, during a later time interval 36b, corruption is enabled (or at least significantly increased).

Figure 4:
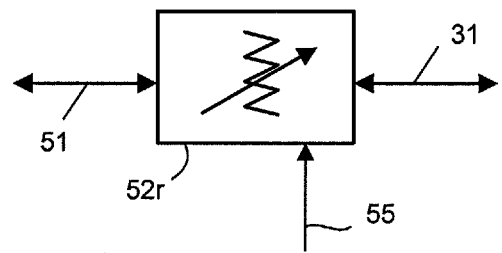
FIG. 4 depicts an exemplary embodiment of a signal corruption circuit for the test environment of FIG. 1.

Referring to FIG. 4, as an exemplary embodiment, the signal corruption circuits 52 can be implanted as controllable signal attenuator circuitry 52r, various forms of which are well known in the art, to cause the packet data stream to have an insufficient power level for successful reception.

Figure 5:
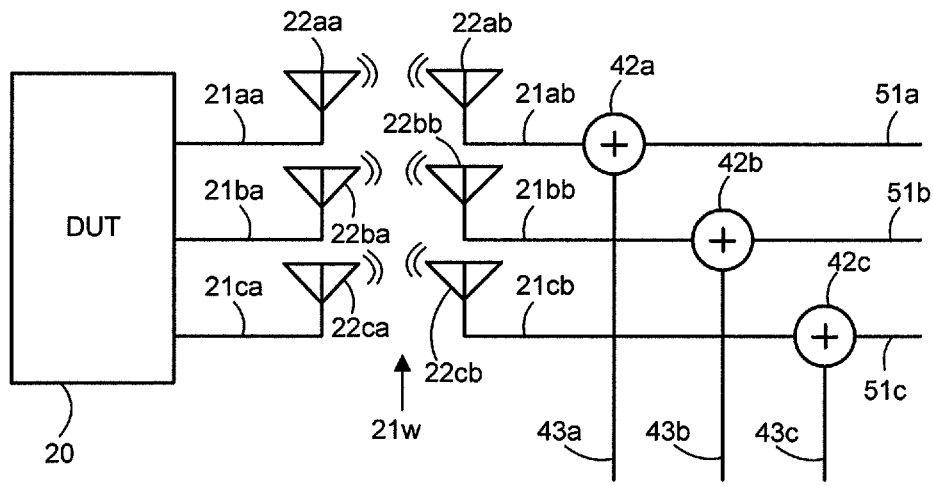
FIG. 5 depicts an alternative embodiment of a portion of the test environment of FIG. 1.

Referring to FIG. 5, in accordance with another exemplary embodiment, the portions 21 of the signal paths between the DUT 20 and signal splitters 42a, 42b, 42c can be implemented as wireless signal paths 21w, in which antennas 22aa, 22ba, 22ca connected to the DUT 20 communicate with antennas 22ab, 22bb, 22cb connected to the signal splitters 42a, 42b, 42c to convey the packet data streams. Such a cable-free interface for the DUT 20 would be have the advantage of operating the DUT 20 in a more realistic manner and avoid the need to physically connect and disconnect test cables to and from the DUT 20.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing of a radio frequency (RF) multiple-input, multiple-output (MIMO) packet data signal transceiver device under test (DUT), comprising:

establishing a MIMO communication link between a test transceiver and a DUT for communicating via a plurality of N DUT packet data signals provided by said DUT for said test transceiver and a plurality of test packet data signals provided by said test transceiver for said DUT, wherein N is an integer; and maintaining said MIMO communication link while corrupting at least a portion of one or more of said plurality of N DUT packet data signals to provide a partially corrupted plurality of N DUT packet data signals containing said plurality of N data streams, receiving, with said test transceiver, said partially corrupted plurality of N DUT packet data signals containing said plurality of N data streams and, responsive thereto, failing to timely provide, with said test transceiver, a corresponding portion of said plurality of test packet data signals, and following said failing to timely provide, with said test transceiver, said corresponding portion of said plurality of test packet data signals, receiving, with said test transceiver, said partially corrupted plurality of N DUT packet data signals containing a plurality of N−M data streams, wherein M is an integer and 0<N−M<N.

2. The method of claim 1, wherein said plurality of test packet data signals comprises a plurality of N test packet data signals.

3. The method of claim 1, wherein said maintaining said MIMO communication link comprises continuously maintaining said MIMO communication link.

4. The method of claim 1, wherein said establishing a MIMO communication link between a test transceiver and a DUT for communicating via a plurality of N DUT packet data signals provided by said DUT for said test transceiver and a plurality of test packet data signals provided by said test transceiver for said DUT comprises:

transmitting, with said test transceiver, a plurality of communication link initiation packet data signals as said plurality of test packet data signals; and receiving, with said test transceiver from said DUT, a plurality of N communication link confirmation packet data signals as said plurality of N DUT packet data signals.

5. The method of claim 1, wherein said establishing a MIMO communication link between a test transceiver and a DUT for communicating via a plurality of N DUT packet data signals provided by said DUT for said test transceiver and a plurality of test packet data signals provided by said test transceiver for said DUT comprises conveying at least said plurality of N DUT packet data signals via a plurality of N conductive signal paths one or more of which has a variable signal conductivity.

6. The method of claim 1, wherein said corrupting at least a portion of one or more of said plurality of N DUT packet data signals to provide a partially corrupted plurality of N DUT packet data signals containing said plurality of N data streams comprises attenuating at least a portion of one or more of said plurality of N DUT packet data signals.

7. The method of claim 1, wherein said corrupting at least a portion of one or more of said plurality of N DUT packet data signals to provide a partially corrupted plurality of N DUT packet data signals containing said plurality of N data streams comprises attenuating a latter portion of at least one of said plurality of N DUT packet data signals.

8. The method of claim 1, further comprising, following said receiving, with said test transceiver, said partially corrupted plurality of N DUT packet data signals containing a plurality of N−M data streams, timely providing, with said test transceiver, a corresponding portion of said plurality of test packet data signals.

9. The method of claim 1, further comprising, following said receiving, with said test transceiver, said partially corrupted plurality of N DUT packet data signals containing a plurality of N−M data streams, timely providing, with said test transceiver, a plurality of N test packet data signals as said plurality of test packet data signals.

10. The method of claim 1, further comprising monitoring said plurality of DUT packet data signals.

11. A method of testing of a radio frequency (RF) multiple-input, multiple-output (MIMO) packet data signal transceiver device under test (DUT), comprising:
    establishing a MIMO communication link between a test transceiver and a DUT for communicating via a plurality of N DUT packet data signals provided by said DUT for said test transceiver and a plurality of test packet data signals provided by said test transceiver for said DUT, wherein N is an integer, each one of said plurality of N DUT packet data signals includes one or more DUT data packets, and each one of said plurality of test packet data signals includes one or more test data packets; and
    maintaining said MIMO communication link while
        corrupting at least one of said one or more DUT data packets to provide said plurality of N DUT packet data signals with at least one corrupted DUT data packet and containing said plurality of N data streams,
        receiving, with said test transceiver, said plurality of N DUT packet data signals with at least one corrupted DUT data packet and containing said plurality of N data streams and, responsive thereto, failing to timely provide, with said test transceiver, one or more corresponding portions of said plurality of test packet data signals, and
        following said failing to timely provide, with said test transceiver, said one or more corresponding portions of said plurality of test packet data signals, receiving, with said test transceiver, said plurality of N DUT packet data signals with at least one corrupted DUT data packet and containing a plurality of N−M data streams, wherein M is an integer and 0<N−M<N.

12. The method of claim 11, wherein said plurality of test packet data signals comprises a plurality of N test packet data signals.

13. The method of claim 11, wherein said maintaining said MIMO communication link comprises continuously maintaining said MIMO communication link.

14. The method of claim 11, wherein said establishing a MIMO communication link between a test transceiver and a DUT for communicating via a plurality of N DUT packet data signals provided by said DUT for said test transceiver and a plurality of test packet data signals provided by said test transceiver for said DUT comprises:
    transmitting, with said test transceiver, a plurality of communication link initiation packet data signals as said plurality of test packet data signals; and
    receiving, with said test transceiver from said DUT, a plurality of N communication link confirmation packet data signals as said plurality of N DUT packet data signals.

15. The method of claim 11, wherein said establishing a MIMO communication link between a test transceiver and a DUT for communicating via a plurality of N DUT packet data signals provided by said DUT for said test transceiver and a plurality of test packet data signals provided by said test transceiver for said DUT comprises conveying at least said plurality of N DUT packet data signals via a plurality of N conductive signal paths one or more of which has a variable signal conductivity.

16. The method of claim 11, wherein said corrupting at least one of said one or more DUT data packets to provide said plurality of N DUT packet data signals with at least one corrupted DUT data packet and containing said plurality of N data streams comprises attenuating at least a portion of each of said at least one of said one or more DUT data packets.

17. The method of claim 11, wherein said corrupting at least one of said one or more DUT data packets to provide said plurality of N DUT packet data signals with at least one corrupted DUT data packet and containing said plurality of N data streams comprises attenuating a latter portion of each of said at least one of said one or more DUT data packets.

18. The method of claim 11, further comprising, following said receiving, with said test transceiver, said plurality of N DUT packet data signals with at least one corrupted DUT data packet and containing a plurality of N−M data streams, timely providing, with said test transceiver, a corresponding portion of said plurality of test packet data signals.

19. The method of claim 11, further comprising, following said receiving, with said test transceiver, said plurality of N DUT packet data signals with at least one corrupted DUT data packet and containing a plurality of N−M data streams, timely providing, with said test transceiver, a plurality of N test packet data signals as said plurality of test packet data signals.

20. The method of claim 11, further comprising monitoring said plurality of DUT packet data signals.

* * * * *